March 1, 1960 K. GEBELE 2,926,586
PHOTOGRAPHIC SHUTTER
Filed May 10, 1955 3 Sheets-Sheet 1
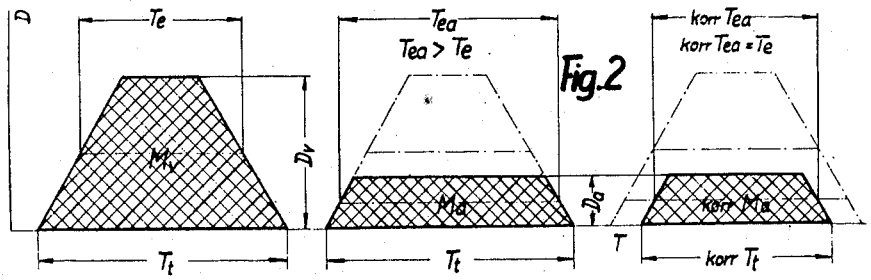
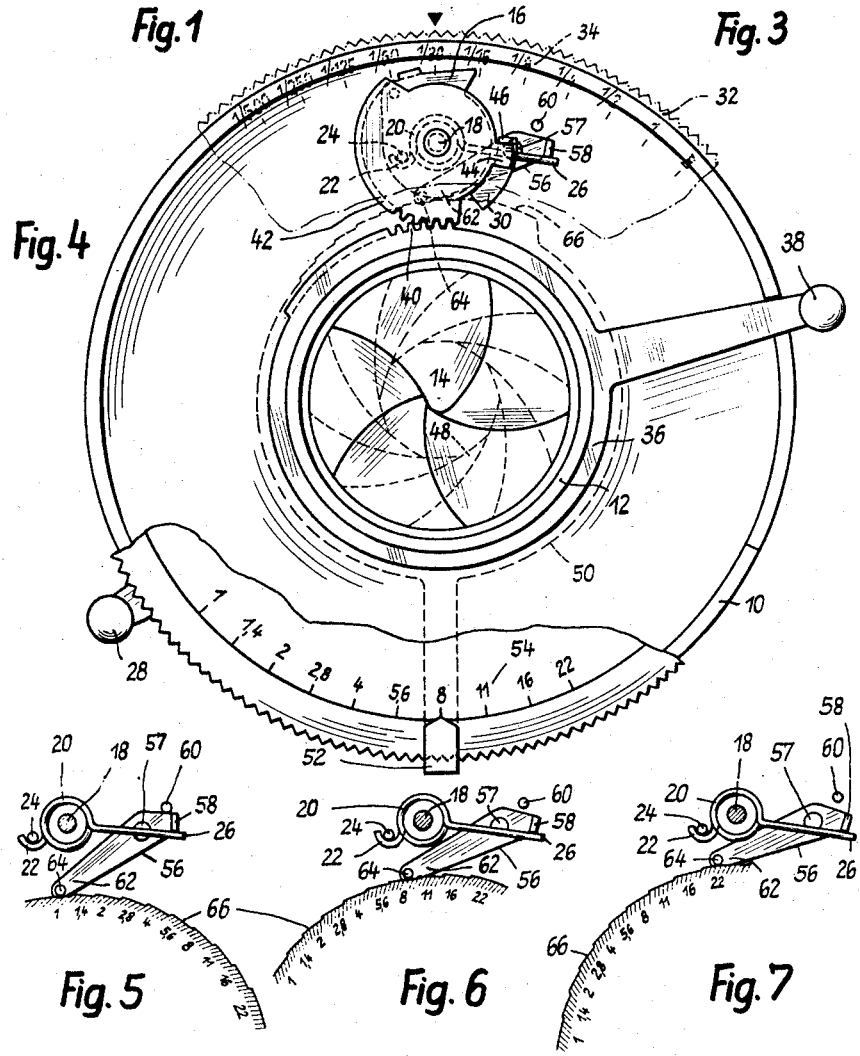

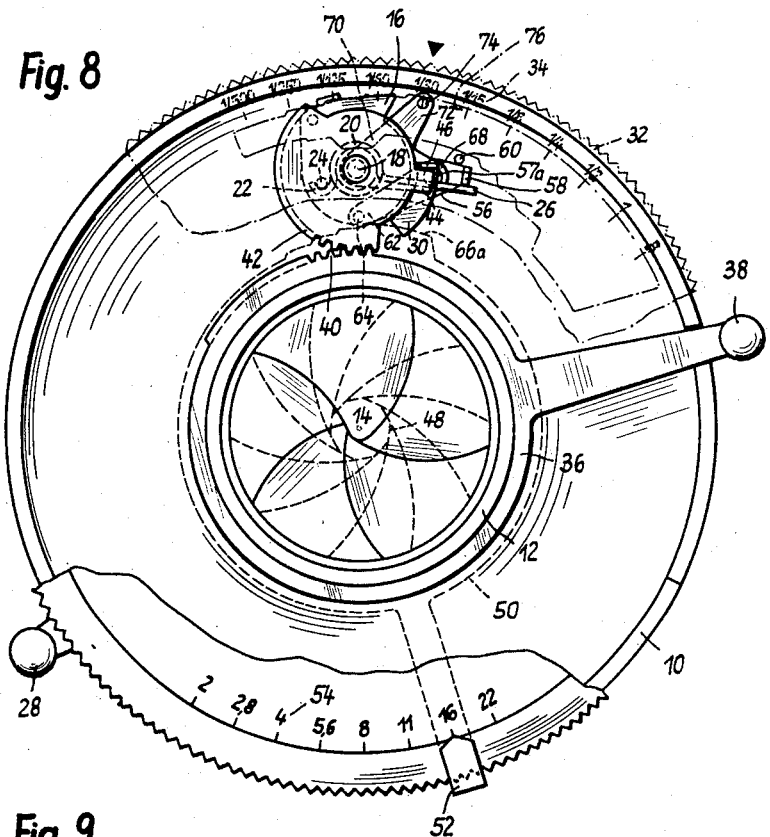

March 1, 1960  K. GEBELE  2,926,586
PHOTOGRAPHIC SHUTTER

Filed May 10, 1955  3 Sheets-Sheet 3

United States Patent Office 2,926,586
Patented Mar. 1, 1960

2,926,586

PHOTOGRAPHIC SHUTTER

Kurt Gebele, Munich, Germany, assignor, by mesne assignments, to Compur-Werk Friedrich Deckel OHG., Munich, Germany, a firm of Germany Application May 10, 1955, Serial No. 507,289

Claims priority, application Germany May 11, 1954

11 Claims. (Cl. 95—64)

In a photographic shutter of the objective or between-the-lens type, it can be demonstrated that if exposures are made at different diaphragm aperture or stop settings but at the same shutter speed setting, the exposures made with a small diaphragm aperture will have a greater average or effective length or duration than those made at a greater aperture. If the shutter speed scale is graduated accurately in equivalent exposure time for exposures made at maximum aperture (as is usually the case), then if an exposure is made at relatively small aperture, the equivalent exposure time will be longer than that indicated by the shutter speed scale. This results in incorrect exposures, especially when exposures are made at very small diaphragm aperture setting, e.g. to obtain great depth of field.

An object of the present invention is to provide a generally improved and more satisfactory shutter of the objective or between-the-lens type, having means adapted to correct the above-mentioned condition.

Another object is to provide a shutter with built-in mechanism of simple and inexpensive design, which will automatically adjust the timing or duration of the exposure in accordance with changes in the diaphragm aperture setting, so that the shutter speed or exposure duration scale will be reasonably accurate at all diaphragm aperture settings, rather than merely at the maximum aperture settings.

These and other desirable objects may be attained in the manner disclosed as an illustrative embodiment of the invention in the following description and in the accompanying drawings forming a part hereof, in which:

Fig. 1 is a diagram illustrating the operation of a shutter in making an exposure at maximum aperture;

Fig. 2 is a similar diagram illustrating the making of the exposure at a relatively small aperture and showing also the increased length of equivalent exposure which results from the smaller aperture;

Fig. 3 is a similar diaphragm showing the corrected length of equivalent exposure at small aperture, according to the present invention;

Fig. 4 is a fragmentary face view of a photographic shutter, with parts broken away and parts omitted for the sake of clarity, illustrating a first embodiment of the present invention;

Fig. 5 is a view of certain parts of Fig. 4 with overlying parts omitted for the sake of clarity, showing the shutter diaphragm mechanism set for a maximum diaphragm aperture of $f:1$, the shutter driving spring being under normal tension;

Fig. 6 is a similar view showing the diaphragm aperture mechanism set for a smaller aperture such as $f:8$, placing the shutter driving spring under somewhat increased tension;

Fig. 7 is another similar view showing the shutter diaphragm aperture mechanism set for the smallest aperture such as $f:22$, with the shutter driving spring tensioned to a still greater degree;

Fig. 8 is a view similar to Fig. 1 illustrating a second embodiment of the invention in which the tension of the shutter driving spring is dependent not only upon the setting of the diaphragm aperture mechanism but also upon the setting of the shutter speed control mechanism;

Fig. 9 is a view of certain parts shown in Fig. 8 with overlying parts removed for clarity, with the aperture mechanism set for an aperture of $f:11$ and with the shutter timing or speed mechanism set for an exposure of $\frac{1}{125}$ of a second, the shutter driving spring being under a somewhat increased tension;

Fig. 10 is a view similar to Fig. 9 showing the greater tension produced on the shutter driving spring when the diaphragm aperture mechanism is set for an aperture of $f:22$ and the shutter timing mechanism is set for a shutter speed of $\frac{1}{500}$ of a second;

The same reference numerals throughout the several views indicated the same parts.

Figure 11:
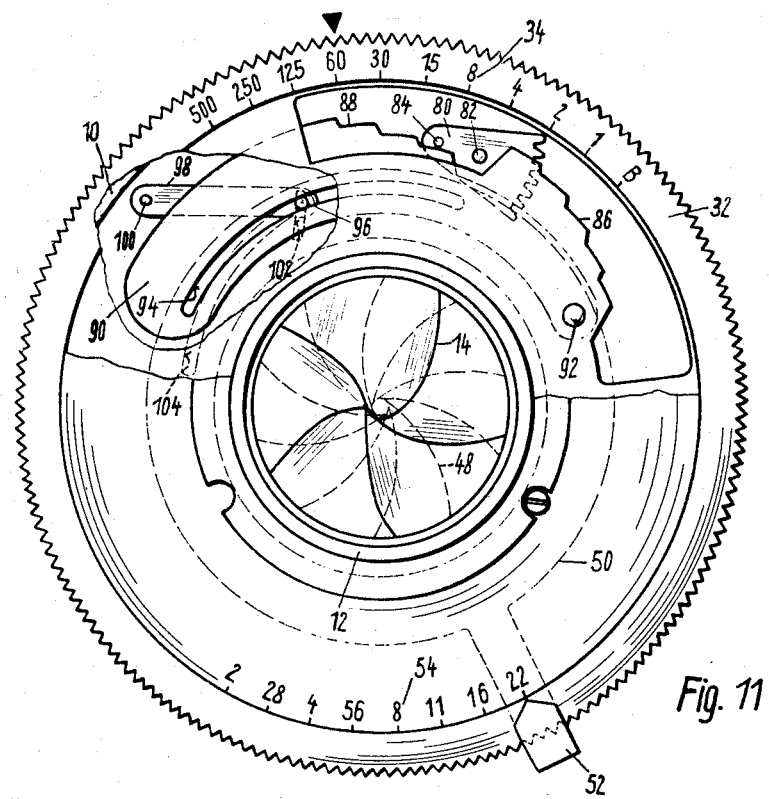
Fig. 11 is a view similar to Figs. 4 and 8 showing a third embodiment of the invention, wherein the speeding up of the exposure for small diaphragm aperture settings is accomplished by affecting the operation of the retarding mechanism rather than by affecting the tension of the driving spring.

In order to understand more clearly the effect of diaphragm aperture upon shutter speed, reference is first made to Fig. 1, which constitutes a familiar type of shutter exposure diagram. Time is plotted horizontally as the abscissa, and diameter of the opening is plotted vertically as the ordinate. The first inclined line, at the left of the diagram, indicates the increasing diameter of the aperture or opening while the blades are moving in an opening direction. The upper horizontal line indicates the condition while the blades remain fully open at the maximum aperture diameter $D_v$, and the second sloping line at the right end of the diagram indicates the decreasing aperture while the blades are closing.

According to the best and most approved practice, the time of exposure produced by a shutter should be rated, not by the total time that the blades are open to any degree (pin point opening to pin point closing), which would be represented by the length $T_t$ of the bottom horizontal line in Fig. 1, nor by the length of time that the blades remain at maximum opening, represented by the top horizontal line in Fig. 1, but on the contrary the shutter should be rated by the average or equivalent length of time that the blades are open; in other words, the time that the blades remain fully open, plus half the time required to open the blades, plus half the time required to close the blades. This average time, constituting what is called the equivalent exposure time, is indicated in Fig. 1 at $T_e$, and is the time which should properly be marked on the shutter speed scale. The amount of quantum of light received by the film during this exposure is represented by the area of the trapezoid, indicated at $M_v$, which is the product of $T_e \times D_v$.

Referring now to Fig. 2, let it be assumed that the diaphragm is stopped down to a smaller diameter represented by $D_a$, without any change in the speed setting of the shutter. Therefore the blades will open and close as before, and the total open time of the blades will be the same as before, represented by $T_t$. But the blades will more quickly reach their maximum effective opening (determined now by the size of the diaphragm aperture rather than the maximum opening size of which the blades are physically capable) and so the average open time of the blades, represented at $T_{ea}$ will be substantially greater than $T_e$ in the previous diagram. Thus the true length of exposure, and the amount of light $M_a$ reaching the film, will be greater than that indicated by the reading of the shutter speed scale and the diaphragm aperture scale.

The present invention corrects this condition by increasing the speed (decreasing the duration of exposure) of the shutter when small apertures are used, the corrected condition being illustrated in the diagram constituting Fig. 3. Here the same aperture $D_a$ is used as in Fig. 2, but the exposure is speeded up to produce a shortened or corrected total exposure time $T_t$, so that the corrected $T_{ea}$ or time of average or equivalent opening is equal to $T_e$ in the first diagram, Fig. 1. The amount of light, corrected $M_a$, reaching the film, is now equal to that indicated by the readings of the shutter exposure scale and the diaphragm aperture scale, rather than being greater.

$$\text{corrected } M_a = T_e \times D_a = \text{corrected } T_{ea} \times D_a$$

According to the first embodiment of the present invention, this correction to make the exposure shorter or quicker when a smaller aperture is used, for the same setting of the shutter speed scale, is accomplished by tensioning the main driving spring of the shutter to a greater extent when the shutter is set for small aperture, thereby driving the blades somewhat faster to accomplish the desired correction.

Reference is now made to Figs. 4–7 showing somewhat diagrammatically the construction of this first embodiment of the invention. The shutter comprises the usual annular casing 10 and the usual lens tube 12, and has shutter blades 14 movable to open and close the aperture defined by the tube 12, the blades being driven in known manner (the details of which are not important here) from a main driving member or master member 16 which is mounted for rotation on a pivot 18 carried by the shutter casing 10. The main drive spring or power spring 20 of the shutter is coiled around the pivot 18 and has one end 22 in engagement with a pin 24 projecting from the master member 16. The other end 26 of the drive spring 20 is held stationary during the making of an exposure, but is anchored in an adjustable manner as further set forth below.

The master member or main driving member 16 is cocked or tensioned ready for an exposure by turning it in a counterclockwise direction by any suitable tensioning mechanism including, for example, a cocking or tensioning ring 36 rotatable about the lens tube 12 and having a handle 38 projecting radially outwardly through a slot in the shutter casing, to a manually accessible external position. Upon turning the handle 38 in a clockwise direction, gear teeth 40 on the ring 36 mesh with gear teeth on the cocking or tensioning disk 42 mounted for rotation above the master member 16 on the same pivot 18, which member 42 has a lug 44 cooperating with a lug or ear 46 on the master member to drive the latter in a counterclockwise direction (thus winding up or tensioning the main driving spring 20) until the master member reaches its fully wound position, in which it is retained by any suitable latch (not shown) capable of being released or unlatched by movement of the accessible shutter trigger or release member 28. After the setting operation, the setting ring 36 and the disk 42 return to their initial rest positions.

After the master member has been set or tensioned, actuation of the shutter trigger or release member 28 will release the latch of the master member, allowing the spring 20 to turn the master member in a clockwise direction, during which turning movement the master member serves to open and then to close the shutter blades 14 through suitable intermediate driving mechanism of known form, not here shown. During this running down or blade-operating movement of the master member, a control cam or lug portion 30 thereon engages the usual escapement mechanism to slow or delay the running down movement of the master member to a variable or adjustable extent, so as to regulate the exposure time or speed of the shutter. The position of the escapement mechanism and thus the duration of the exposure time is adjusted in the usual manner by means of a rotatable shutter speed setting ring 32 supported for rotation adjacent the front face of the shutter casing 10, and carrying an exposure time scale indicated diagrammatically at 34, indicating the time in seconds or fractions of a second, such as the readings from one second to $\frac{1}{500}$ of a second. The shutter is adjusted, during manufacture and assembly, so that the scale values, when read in conjunction with the stationary index mark or pointer shown diagrammatically at the top of Fig. 4, will indicate with reasonable accuracy the average or equivalent exposure time $T_e$ as discussed in connection with Fig. 1.

The details of the mentioned shutter blades driving and setting mechanism are disclosed in U.S. patent application, Serial No. 306,562, filed August 27, 1952, by Franz Singer, now Patent 2,785,612, issued March 19, 1957.

Arranged in the shutter casing behind the shutter blades 14 is the usual iris diaphragm of known construction, including the diaphragm leaves indicated diagrammatically at 48, adjusted in the usual manner to larger or smaller apertures by means of the diaphragm adjusting ring 50 mounted for rotation adjacent the rear face of the shutter casing and having a handle 52 which extends radially to the periphery of the casing and thence is brought forwardly around the edge of the casing to an accessible position in the front, terminating in a pointer cooperating with a diaphragm aperture scale 54 normally graduated in terms of $f$ number, the graduations here shown being from $f:1$ through the usual series of steps to $f:22$. Of course the graduations will vary in different shutters, depending upon the size of the shutter and the characteristics of the lens mounted therein.

For the purpose of correcting the equivalent or average exposure time $T_e$ in the manner explained in connection with Figs. 1 to 3, provision is made for increasing the tension of the driving spring 20 when the diaphragm is set for a smaller aperture, thus speeding up the operation of the shutter, to a sufficient extent to maintain the equivalent exposure time constant over substantially the entire range of diaphragm setting. In the first embodiment of the invention, this is accomplished by holding the end 26 of the driving spring 20 by means of a lug 58 on one end of a control lever 56 which is pivoted at an intermediate point on a fixed pivot 57 in the shutter casing. Another fixed pin 60 in the shutter casing limits the maximum extent of turning of the lever 56 in a counterclockwise direction on its pivot 57. The other end 62 of the control lever 56 carries a pin 64 which projects, through a suitable opening in the rear wall of the shutter casing, into the plane of the diaphragm setting ring 50, and cooperates with a cam surface 66 on the ring 50, which cam surface may be of stepped formation as shown for sake of clarity, or smooth with a gradual rise.

When the diaphragm adjusting ring 50 is turned to open the diaphragm aperture to its maximum extent, the part of the cam 66 which lies opposite the pin 64 is relatively low, as seen in Fig. 5, so that the cam does not affect the position of the lever 56, and the lever occupies its initial position determined by the pin 60. The main driving spring 20 is then under what may be called its normal degree of tension (when the master member is fully cocked or tensioned and latched). However, as the diaphragm setting ring 50 is progressively turned in a counterclockwise direction to set the diaphragm to a processively smaller and smaller aperture, a progressively higher part of the cam 66 comes under the pin 64 and raises this pin, turning the lever 56 clockwise on its pivot 57, so that the lug 58 presses downwardly on the end 26 of the driving spring 20, producing additional tension in the driving spring. The position of the parts when the diaphragm is set for an aperture of f:8 is shown in Figs. 4 and 6. The additional tension of the driving spring is such that, when an exposure is made with this aperture, it is speeded up enough to give an average or equivalent exposure time of the proper amount as already explained in connection with Figs. 1–3, so that the exposure time scale 34 on the shutter remains an accurate indication of the actual length of the equivalent exposure, notwithstanding the small aperture used.

When the diaphragm is set to its smallest aperture (in this case, f:22, as shown in Fig. 7) the portion of the cam 66 in engagement with the pin 64 is still higher, thereby swinging the lever 56 still further in a clockwise direction on its pivot 57, and causing the lug 58 to tension the spring 20 to a still greater degree. For any desired diaphragm setting within the entire range of diaphragm aperture, the driving spring is tensioned to an appropriate additional degree (for any aperture smaller than the maximum aperture) to give the necessary correction.

From a parctical standpoint, however, a correction of this kind is only needed in the case of very small diaphragm apertures, or very short exposures. When the exposure is relatively long, or when the diaphragm aperture is relatively great even though not of the maximum possible aperture, the theoretical correction is such a small percentage of the total exposure time that it is within the permissible range of tolerance or latitude of the film, so that no correction is really needed. It is within the scope of the invention, therefore, to shape the cam 66 so that it will turn the lever 56 only when a relatively small aperture is used, leaving the lever 56 unaffected for apertures which are smaller than maximum aperture but still relatively large.

There is greater need for correction, as a practical matter, when the exposure is made at a relatively fast speed and with a small aperture, than when it is made at a slower speed with the same small aperture. Therefore, according to a second embodiment of the invention, the extent of correction is made to depend partly upon the speed setting of the shutter, as well as upon the diaphragm aperture setting.

In this second embodiment, illustrated diagrammatically in Figs. 8–10, the parts are closely similar to the embodiment previously described. But the lever 56, instead of being pivoted on a stationary pivot 57 as before, is now pivoted on a pivot 57a which is carried by one arm 68 of a forked lever 70 which in turn is pivoted on any suitable stationary pivot such as the pivot 18 of the master member. The other arm 72 of this forked lever 70 carries a pin 74 which extends forwardly within the shutter casing and cooperates with a cam surface 76 provided on the shutter speed setting ring 32 which is arranged at the front of the shutter casing. This cam 76, like the previous cam 66, is illustrated as being of stepped formation for the sake of clarity, but it may be a gradually rising smooth cam surface, if preferred. The steps (or the height of the cam at different locations, if it is smooth) correspond to different speed settings, and are marked with the speed indications in Figs. 9 and 10 for the sake of clarity.

This cam 76 may be provided only for the higher speed settings, for example from 1/30 of a second to the highest speed such as 1/500 of a second, as shown in Fig. 9, and the other cam on the diaphragm setting ring (this cam being here designated at 66a rather than the previous designation 66) may likewise have effective portions corresponding only to the smaller apertures, such as f:5.6 to f:22.

With this arrangement, when the shutter is set for a relatively slow exposure and also for a large aperture, the respective cams 76 and 66a do not come into play, and the lever 56 lies against the stop pin 60, so that the main spring 20 of the shutter is tensioned only to its normal extent. If the diaphragm is set to a relatively small aperture, however, then the cam 66a moves the pin 64 to swing the lever 56 on its pivot 57a, thus additionally tensioning the spring 20 to some extent. Also, if the speed control member of the shutter is set for one of the higher shutter speeds, the cam 76 will swing the pin 74 to move the lever 70 in a clockwise direction on its pivot 18, thus shifting downwardly the entire pivot 57a of the lever 56, so that the lug 58 at the right hand end of the lever 56 is shifted downwardly and thus the spring 20 is given additional tension or power. In this way the tension of the spring is under the joint control of the diaprhagm aperture cam 66a and the shutter speed cam 76, and the ultimate tension of the spring 20 depends partly upon the diaphragm aperture setting and partly upon the speed setting.

In Fig. 9 the parts are shown set for an aperture of f:11 and an exposure speed of 1/125 of a second, and the tail end 26 of the spring 20 is moved to some extent, as seen, to produce additional tension. In Fig. 10 the parts are shown set for the smallest aperture of f:22, and the highest shutter speed of 1/500 of a second, and it is seen that the tail 26 of the spring 20 is moved farther, thus giving additional tension to the spring, to make the required correction so that actual equivalent shutter speed will agree with the speed rating on the scale 34.

In Figs. 11–14 is shown still another embodiment of the invention, in which the correction of shutter speed is accomplished not by additional tension on the main driving spring, but by varying the acton of the shutter retarding mechanism.

As well understood in the photographic shutter art, the running down movement of the main drive member or master member of the shutter is normally delayed to some extent by a retarding mechanism in the form of a clockwork escapement mechanism, an example of such construction being disclosed in the Deckel and Geiger U.S. Patent 1,687,123, dated October 9, 1928. The effect of the escapement mechanism in delaying the travel of the master member, in the shutter shown in this patent and in other modern shutters, is varied by means of a cam attached to and moving with the shutter speed setting member 32 above mentioned, which corresponds in general to the shutter speed setting ring 63 in said Deckel and Geiger patent. As explained in the patent, the speed setting ring is equipped with a cam 61 which cooperates with the pin 46 of the retarding gear segment 44 of the gear train, to determine the initial position of this gear segment at the beginning of the exposure, and thus to determine the extent to which the gear train will retard the running down movement of the master member.

The corresponding gear segment of the gear train, in this embodiment of the present invention, is indicated diagrammatically at 80 in Fig. 11, and is pivoted on the fixed pivot 82. The pin 84 on the gear segment cooperates with the cam portions 86 and 88 on the speed setting ring 32, to determine the initial position of the gear segment at the beginning of the exposure in accordance with various speed settings of the shutter, or otherwise to vary the retarding action of the gear train in known manner.

According to the present invention, the control cam 88 is not formed directly on the shutter speed setting ring 32, but is formed as part of a segment 90 which is pivoted to the speed setting ring 32 by means of a pivot pin 92. This segment 90 is formed with an arcuate slot 94 engaged by the forward end of an adjusting pin 96 carried by a rockable arm or lever 98 pivoted on a stationary pin 100. The rear end of the pin 96 projects through a slot 102 formed in the rear wall of the shutter casing 10, and engages a cam or arcuate control slot 104 formed on or in the diaphragm setting ring 50.

The center of curvature of the cam slot 104 is offset with relation to the optical axis about which the diaphragm setting member 50 rotates, so that as the diaphragm setting member turns in one direction or the other, to increase or decrease the aperture, the pin 96 is shifted closer to or farther away from the optical axis or center of the shutter. Since the forward end of the pin is engaged in the slot 94 of the segment 90, it follows that the segment 90 is swung on its pivot 92 in accordance with different aperture settings of the diaphragm. Since the segment 90 carries the cam 88, it follows that a change in diaphragm setting will change the effect of the cam 88 on the pin 84 of the retarding mechanism, thereby enabling the diaphragm aperture setting to control to some extent the effect of the retarding mechanism on the running down of the master member of the shutter.

Thus by properly disigning the shape of the cam 88 with relation to the shape of the cam 104 on the diaphragm setting member, the shutter may be so constructed that the retarding effect of the gear train is made less (that is, the exposure time is speeded up) when the diaphragm is set for a relatively small aperture, than it is when the diaphragm is set for a larger aperture. This produces the correction which is necessary to keep the shutter speed scale accurate for exposures at small aperture, as above explained in connection with Figs. 1–3.

Figure 12:
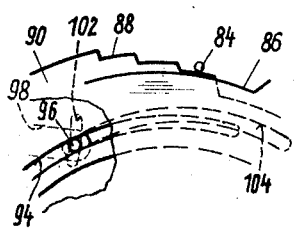
Fig. 12 is a view of certain parts shown in Fig. 11 with overlying parts omitted for clarity, showing the situation when the shutter is set for a relatively large aperture.
Figure 13:
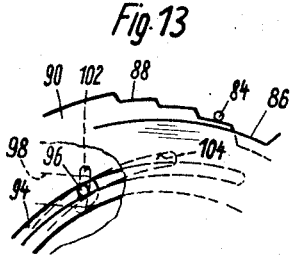
Fig. 13 is a view similar to Fig. 12 showing the parts when the shutter is set for a somewhat smaller aperture.
Figure 14:
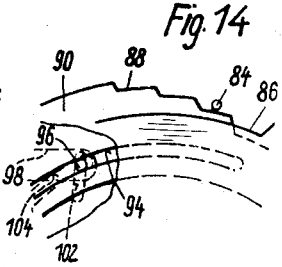
Fig. 14 is a view similar to Figs. 12 and 13 showing the relationship of the parts when the shutter is set for a still smaller aperture.

For example, in Figs. 11 to 14, the shutter is in all cases set for an equivalent exposure time of 1/60 of a second. Fig. 12 diagrammatically illustrates the position of the parts when the shutter is set for maximum aperture, e.g., $f:2$. Fig. 13 shows the parts when set for a somewhat smaller aperture, e.g., $f:8$. Fig. 14 shows the parts when set for the smallest diaphragm aperture, e.g., $f:22$. It will be apparent from comparing Figs. 12, 13 and 14 that as the diaphragm aperture is reduced in size, the segment 90 together with its cam 88 is rocked slightly in a clockwise direction on its pivot 92, thereby reducing the delaying action of the escapement mechanism and shortening the exposure duration so that the equivalent exposure time is maintained constant while the diaphragm aperture is reduced.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A variable speed photographic shutter including shutter blades movable during all exposures through uniform paths of travel from closed positions to a uniform aperture at fully opened positions, a master member for driving said blades through said uniform paths of travel to open and close them to make an exposure, said master member being mounted for rotation about an axis offset from the optical axis of the shutter, a single spring coiled partially around the axis of rotation of said master member for driving said master member, said spring having one end secured to said master member and having another end extending therefrom, retarding mechanism for retarding movement of said master member, diaphragm blades separate from said shutter blades and mounted for movement to various different apertures, a diaphragm aperture adjusting member, an exposure speed adjusting member, and means controlled at least in part by movement of said diaphragm aperture adjusting member for varying the position of said other end of said springs, thereby to vary the speed of operation of said master member for any given setting of said speed adjusting member, to make said speed of operation faster when said aperture adjusting member is set for a relatively small aperture than it is when said aperture adjusting member is set for a larger aperture.

2. A construction as defined in claim 1, wherein said means includes means for tensioning said driving spring to a greater extent when said aperture adjusting member is set for a relatively small aperture than when it is set for a larger aperture.

3. A construction as defined in claim 2, in which said spring tensioning means is controlled in part by said speed adjusting member.

4. A construction as defined in claim 1, wherein said means includes means controlled at least in part by said aperture adjusting member for varying the effect of said retarding mechanism on said master member.

5. A photographic shutter including means forming an exposure opening, movable blades, a master member mounted for rotation about an axis offset from said exposure opening for driving said blades to open and close them with respect to said exposure opening to make an exposure, a single spring for driving said master member, said spring being coiled around the axis of rotation of said master member and having one end connected to said master member in driving relation thereto, a lever connected to the other end of said spring to vary the tension thereof, a diaphragm aperture adjusting member, a cam on said aperture adjusting member cooperating with said lever to increase the tension of said spring when said aperture adjusting member is set for a relatively small aperture, as compared to the tension of said spring when said aperture adjusting member is set for a larger aperture, a second lever operatively connected to said first mentioned lever, an exposure speed adjusting member, and a cam on said speed adjusting member cooperating with said second lever to increase the tension of said spring when said speed adjusting member is set for a relatively fast shutter speed, as compared with the tension of said spring when said speed adjusting member is set for a slower shutter speed.

6. A construction as defined in claim 5, in which said first lever is fulcrumed on said second lever.

7. A photographic shutter including movable blades, a master member for driving said blades to open and close them to make an exposure, a spring for driving said master member, retarding mechanism for retarding movement of said master member, a diaphragm aperture adjusting member, an exposure speed adjusting member, a control member pivotally mounted on and movable bodily with said speed adjusting member and cooperating with said retarding mechanism to control the action thereof on said master member, a cam on said aperture adjusting member, and an operative connection between said cam and said control member for moving the position of said control member on said speed adjusting member in accordance with movement of said aperture adjusting member.

8. A photographic camera comprising shutter blades movable to open and close the shutter to make an exposure, said blades being movable always to a uniform fully open position during all exposures, means for driving the blades to make an exposure, means for varying the action of said driving means to make exposures of varying nominal duration, an adjustable diaphragm separate from said shutter blades, means for adjusting the aperture of the diaphragm independently of the action of said shutter blades, and means controlled at least in part by said aperture adjusting means for shortening the total time of exposure from pin point opening to pin point closing for a given nominal duration of exposure, when said aperture adjusting means is adjusted for a relatively small aperture, as compared with the total time of exposure for the same nominal duration of exposure when said aperture adjusting means is adjusted for a larger aperture.

9. A photographic objective shutter of the type having shutter blades movable from closed position to a uniform fully open position during all exposures, shutter speed setting means for adjusting the speed of operation of said blades to a nominal value representing equivalent exposure time of an exposure made at maximum aperture, adjustable diaphragm leaves separate from said shutter blades and movable to form a diaphragm aperture of variable size independent of the uniform size of the fully open position of said shutter blades, and diaphragm aperture setting means for adjusting said diaphragm leaves to form diaphragm apertures of different sizes without affecting the uniform size of the fully open position of said shutter blades, characterized by means shifted by movement of said diaphragm aperture setting means at least through a part of its range of movement for decreasing the duration of exposure upon decrease of diaphragm aperture size as compared with the duration of exposure at a larger diaphragm aperture size, for a given setting of said shutter speed setting means, to tend to maintain the equivalent exposure time substantially constant notwithstanding errors in equivalent exposure time which would otherwise result from changes in size of diaphragm aperture.

10. A construction as defined in claim 9, in which said means for decreasing the duration of said exposure includes a spring for driving said shutter blades and a spring tensioning member operatively controlled by said diaphragm aperture setting means to increase the tension of said spring upon movement of said diaphragm aperture setting means in an aperture-reducing direction.

11. A construction as defined in claim 9, in which said means for decreasing the duration of said exposure includes exposure retarding mechanism having a control member operatively controlled by said diaphragm aperture setting means to decrease the retarding effect of said retarding mechanism upon movement of said diaphragm aperture setting means in an aperture-reducing direction.

References Cited in the file of this patent

UNITED STATES PATENTS 798,595   Brueck _____ Sept. 5, 1905

FOREIGN PATENTS 894,957   Germany _____ Oct. 29, 1953